United States Patent [19]
Forsyth

[11] Patent Number: 5,735,175
[45] Date of Patent: Apr. 7, 1998

[54] MULTI-SPEED MANUAL TRANSAXLE

[75] Inventor: John R. Forsyth, Romeo, Mich.

[73] Assignee: New Venture Gear, Inc., Troy, Mich.

[21] Appl. No.: 732,754

[22] Filed: Oct. 18, 1996

[51] Int. Cl.$^6$ ........................................ F16H 3/08
[52] U.S. Cl. ........................ 74/331; 74/325; 74/329
[58] Field of Search ........................ 74/325, 329, 330, 74/331

[56] References Cited

U.S. PATENT DOCUMENTS

| | | | |
|---|---|---|---|
| 4,463,622 | 8/1984 | Freiburger | 74/331 X |
| 4,558,607 | 12/1985 | Szodfridt | 74/339 |
| 4,640,141 | 2/1987 | Knodel et al. | 74/357 |
| 4,738,149 | 4/1988 | Janiszewski | 74/330 |
| 4,738,150 | 4/1988 | Miner | 74/359 |
| 4,776,227 | 10/1988 | Janiszewski | 74/331 |
| 4,799,395 | 1/1989 | Janiszewski | 74/331 |
| 4,802,373 | 2/1989 | Saint-Jean et al. | 74/359 |
| 5,079,965 | 1/1992 | Leber et al. | 74/325 X |
| 5,311,789 | 5/1994 | Henzler et al. | 74/331 |
| 5,333,512 | 8/1994 | Pruss et al. | 74/325 |
| 5,385,065 | 1/1995 | Hofmann | 74/331 |
| 5,445,041 | 8/1995 | Zaiser et al. | 74/325 X |
| 5,465,630 | 11/1995 | Iwamoto | 74/331 |
| 5,479,835 | 1/1996 | Esparsa et al. | 74/331 |
| 5,495,775 | 3/1996 | Lees et al. | 74/331 |

FOREIGN PATENT DOCUMENTS 2081825  2/1982  United Kingdom.

*Primary Examiner*—Khoi Q. Ta
*Attorney, Agent, or Firm*—Harness, Dickey & Pierce, P.L.C.

[57] ABSTRACT

A manual transmission comprising an input shaft, an output shaft, an intermediate shaft having a transfer gear fixed thereto. First and second constant-mesh gearsets are supported between the input and output shafts and a first synchronizer clutch is provided for selectively engaging either of the first and second gearsets for drivably connecting the output shaft to the input shaft and establish first and second forward speed ratios therebetween. Third and fourth constant-mesh gearsets are supported between the input shaft and the intermediate shaft. A fifth constant-mesh gearset is supported between the input and output shafts and is meshed with the transfer gear for drivably connecting the intermediate shaft to the output shaft. A second synchronizer clutch is provided for selectively engaging either of the third and fourth gearsets for drivably connecting the intermediate shaft to the input shaft for establishing third and fourth speed ratios between the input shaft and output shaft. A sixth constant-mesh gearset is supported between the input and output shafts and a third synchronizer clutch is provided for selectively engaging either of the fifth and sixth gearsets for drivably connecting the input shaft to the output shaft for respectively establishing a fifth forward speed ratio and a reverse speed ratio therebetween.

9 Claims, 2 Drawing Sheets

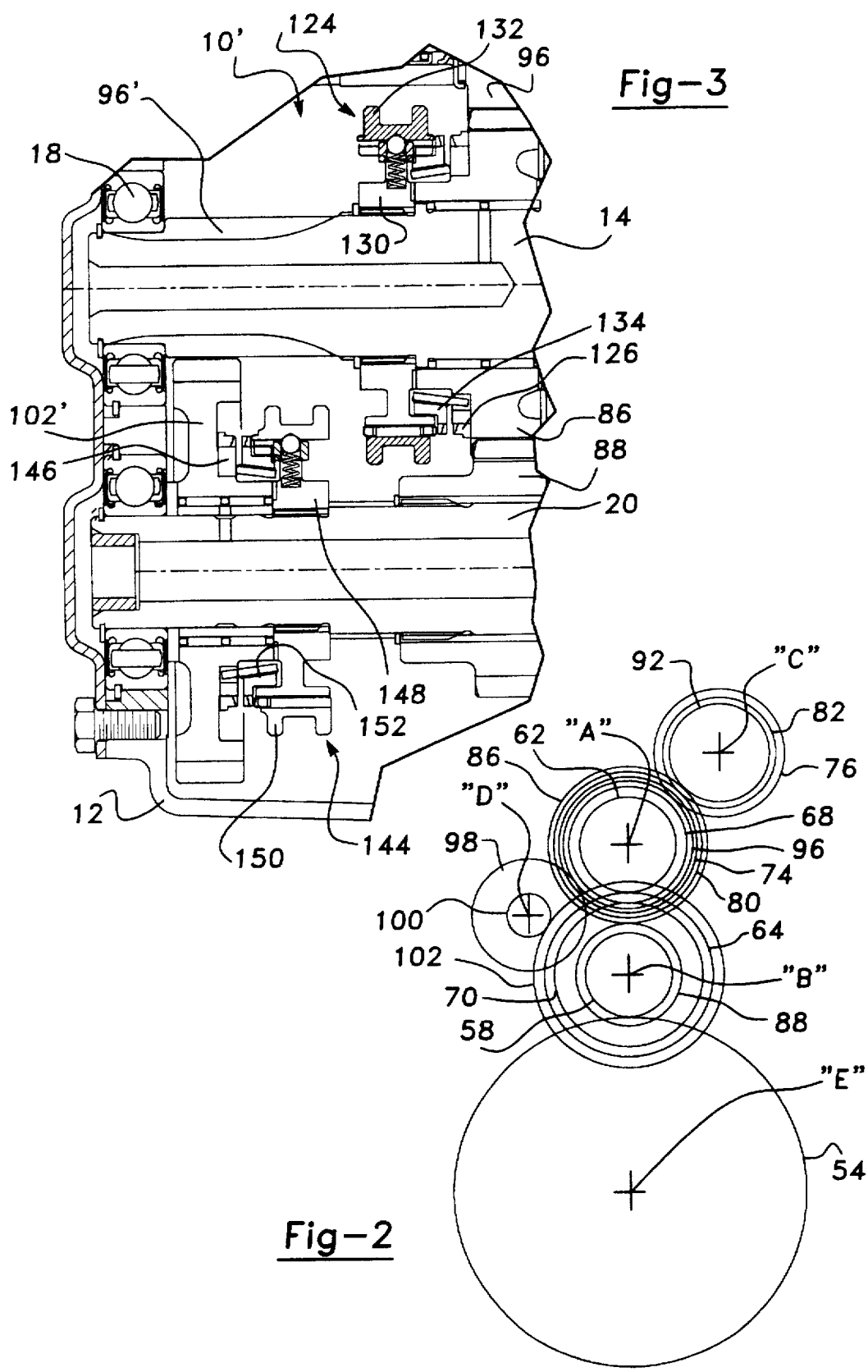

MULTI-SPEED MANUAL TRANSAXLE

BACKGROUND OF THE INVENTION

This invention relates generally to manual multi-speed transmissions of the type used in motor vehicles. More specifically, the present invention is directed to a compact manual transaxle having a synchronized reverse gear.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least forward five speed ratios. As such, minimizing the overall axial length of the transaxle as well as its shaft center distances is of critical importance to the transmission designer. To meet these requirements, various "three-shaft" type transaxles have been developed that include an input shaft and a pair of output shafts each having an output pinion meshed with a drive gear fixed to the differential. A series of gearsets provided between the input shaft and one or both of the output shafts can be selectively engaged to deliver power from the input shaft to a pair of axle half-shafts secured to the differential. For example, U.S. Pat. Nos. 5,311,789, 5,385,065 and 5,495,775 each disclose this type of transaxle.

A problem associated with this type of transaxle relates to the requirement that both of the output shafts be positioned "out-of-plane" relative to the plane extending through the input shaft and the differential. In particular, in order to maintain the center distance between the input shaft and the differential required for adequate driveshaft clearance, the transaxle's input shaft/output shaft center distance and its output shaft/differential center distance must be increased. This results in added geartrain mass and cost while also requiring increased synchronizer capacity.

Accordingly, while such conventional manual transaxle designs attempt to address the packaging requirements mentioned above, a need still exists for development of more compact and robust manual transaxles that can meet the demands of modern front wheel drive vehicular applications.

SUMMARY OF THE INVENTION

The primary object of the present invention is to provide a multi-speed manual transaxle that meets the above-noted needs and improves upon conventional designs.

To this end, the present invention is directed to a five-speed manual transaxle comprised of an input shaft, an output shaft having an output gear fixed thereto, a first input gear fixed to the input shaft, a first speed gear rotatably supported on the output shaft and meshed with the first input gear, a second input gear fixed to the input shaft, a second speed gear rotatably supported on the output shaft and meshed with the second input gear, a first synchronizer clutch for selectively coupling either of the first and second speed gears to the output shaft, a third input gear fixed to the input shaft, a third speed gear rotatably supported on an intermediate shaft and meshed with the third input gear, a fourth input gear fixed to the input shaft, a fourth speed gear rotatably supported on the intermediate shaft and meshed with the fourth input gear, a second synchronizer clutch for selectively coupling either of the third and fourth speed gears to the intermediate shaft, a fifth input gear rotatably supported on the input shaft, a fifth speed gear fixed to the output shaft and meshed with the fifth input gear, a transfer gear fixed to the intermediate shaft and meshed with the fifth input gear, a reverse input gear rotatably supported on the input shaft, a third synchronizer clutch for selectively coupling either of the fifth input gear and the reverse input gear to the input shaft, a reverse output gear fixed to the output shaft, an idler gear meshed with the reverse input gear and the reverse output gear, a drive gear meshed with the output gear, and a differential driven by the drive gear.

In accordance with an alternative embodiment, the transaxle includes an input shaft, an output shaft having an output gear fixed thereto, a first input gear fixed to the input shaft that is meshed with a first speed gear rotatably supported on the output shaft, a second input gear fixed to the input shaft that is meshed with a second speed gear rotatably supported on the output shaft, a first synchronizer clutch for selectively coupling either of the first and second speed gears to the output shaft, a third input gear fixed to the input shaft that is meshed with a third speed gear rotatably supported on an intermediate shaft, a fourth input gear fixed to the input shaft that is meshed with a fourth speed gear rotatably supported on the intermediate shaft, a second synchronizer clutch for selectively coupling either of the third and fourth speed gears to the intermediate shaft, a fifth input gear rotatably supported on the input shaft that is meshed with a fifth speed gear fixed to the output shaft, a transfer gear fixed to the intermediate shaft that is meshed with the fifth input gear, a third synchronizer clutch for selectively coupling the fifth input gear to the input shaft, a reverse input gear fixed to the input shaft, a reverse output gear rotatably supported on the output shaft, an idler gear meshed with the reverse input gear and the reverse output gear, a fourth synchronizer clutch for selectively coupling the reverse output gear to the output shaft, a drive gear meshed with the output gear, and a differential driven by the drive gear.

BRIEF DESCRIPTION OF THE DRAWINGS

Further objects, features and advantages of the present invention will become apparent to those skilled in the art from studying the following description and the accompanying drawings in which:

FIG. 2 is a schematic view showing the shaft and gear arrangement for the five-speed manual transaxle shown in FIG. 1; and FIG. 3 is a partial sectional view showing the transaxle equipped with a synchronized reverse gear arrangement according to an alternative preferred embodiment of the present invention.

DETAILED DESCRIPTION OF THE PREFERRED EMBODIMENT

Figure 1:
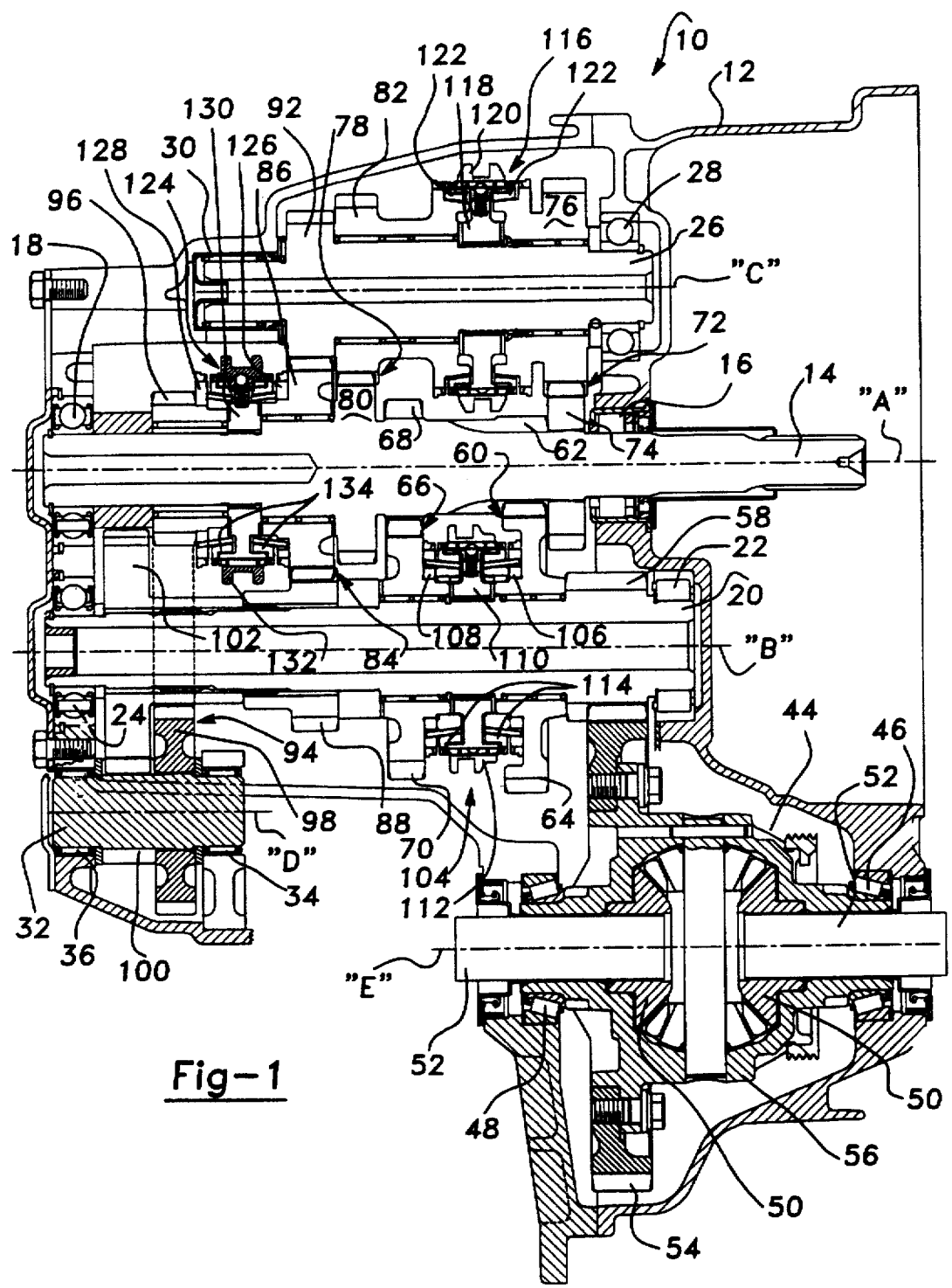
FIG. 1 is a sectional view of a five-speed manual transaxle according to a preferred embodiment of the present invention.

Referring now to the drawings, a manual transaxle 10 is shown that is adapted for use in front wheel drive motor vehicles. Transaxle 10 is a multi-speed arrangement having all of its forward and reverse gears synchronized and yet is efficiently packaged to provide a compact gearbox.

Transaxle 10 is shown to include a housing 12 within which an input shaft 14 is rotatably supported by bearings 16 and 18 for rotation about a first axis "A". As is conventional, input shaft 14 is adapted to be driven through a suitable manually-released clutch (not shown) by the vehicles's engine. Transaxle 10 also includes an output shaft 20 rotatably supported in housing 12 by bearing 22 and 24 for rotation about a second axis "B". In addition, transaxle 10 includes an intermediate shaft 26 rotatably supported in housing 12 by bearings 28 and 30 for rotation about third axis "C", a reverse idler shaft 32 rotatably supported in housing 12 by bearings 34 and 36 for rotation about a fourth axis "D", and a differential 44 supported in housing 12 by bearings 46 and 48 for rotation about a fifth axis "E". The output of differential 44 includes a pair of axially-aligned side gears 50 to which axle half-shafts 52 are fixed in a conventional manner so as to connect differential 44 to the driving wheels of the motor vehicle. The input to differential 44 is a drive gear 54 that is fixed to a differential cage 56 and which is in constant meshed engagement with an output gear 58 fixed to output shaft 20. It will be appreciated that FIG. 1 is a so-called "unrolled" sectional views wherein shafts 14, 20, 26, 32 and 52 are all shown to be arranged in a single plane. However, in reality, these shafts are compactly arranged in a parallel relationship relative to each other, with the rotary axes for shafts 14, 20 and 52 aligned in a common plane, as is shown in FIG. 2. In addition, reverse idler shaft 32 is shown in FIG. 1 to be rotated out of position to illustrate the various components associated with the synchronized reverse gear arrangement. As will be appreciated by reference to FIG. 2, the rotary axis of idler shaft 32 is actually arranged in a triangular orientation with respect to the rotary axes of input shaft 14 and output shaft 20 so as to provide adequate clearance for axle shafts 52. Moreover, since output shaft 20 is located in a common plane with input shaft 14 and differential 44, the center distances between these shafts can be effectively minimized.

Transaxle 10 includes a series of constant-mesh gearsets that can be selectively, engaged for establishing five forward speed ratios as well as a reverse speed ratio between input shaft 14 and output shaft 20. In this regard, gearset 60 includes a first input gear 62 fixed to input shaft 14 and a first speed gear 64 rotatably supported on output shaft 20. First speed gear 64 is in constant mesh with first input gear 62 for defining a first power transmission path that can be selectively engaged to establish a first forward speed ratio. Gearset 66 includes a second input gear 68 fixed to input shaft 14 that is in constant mesh with a second speed gear 70 rotatably supported on output shaft 20. Thus, gearset 66 defines a second power transmission path that can be selectively engaged to establish a second forward speed ratio. Gearset 72 includes a third input gear 74 fixed to input shaft 14 that is in constant mesh with a third speed gear 76 rotatably supported on intermediate shaft 26. As such, gearset 72 defines a third power transmission path that can be selectively engaged to establish a third forward speed ratio. Gearset 78 includes a fourth input gear 80 fixed to input shaft 14 that is in constant mesh with a fourth speed gear 82 rotatably supported on intermediate shaft 26. Thus, gearset 78 defines a fourth power transmission path that can be selectively engaged to establish a fourth forward speed ratio. Gearset 84 includes a fifth input gear 86 rotatably supported on input shaft 14 that is in constant mesh with a fifth speed gear 88 fixed to output shaft 20. Gearset 84 defines a fifth power transmission path that can be selectively engaged to establish a fifth forward speed ratio. In addition, gearset 84 also functions to provide a means for transferring drive torque from intermediate shaft 26 to output shaft 20. Specifically, a transfer gear 92 is fixed to intermediate shaft 26 and is in constant mesh with fifth input gear 86. Finally, gearset 94 includes a reverse input gear 96 rotatably supported on input shaft 14 that is in constant mesh (as shown by phantom lines in FIG. 1) with a first idler gear 98 fixed to idler shaft 32. Gearset 94 includes a second idler gear 100 that is also fixed to idler shaft 32 and is in constant mesh with a reverse output gear 102 fixed to output shaft 20. As such, gearset 94 defines a sixth power transmission path that can be selectively engaged to reverse the direction of rotation of output shaft 20 and establish the reverse speed ratio. It is contemplated that gearset 94 could be modified such that second idler gear 100 is eliminated with first idler gear 98 meshing with both reverse input gear 96 and reverse output gear 102 if adequate spacing is available.

To provide means for establishing the various forward and reverse speed ratios between input shaft 14 and output shaft 20 by selectively engaging one of the six available power transmission paths, each gearset is associated with a synchronizer clutch. In particular, a first synchronizer clutch 104 is operably located between first and second speed gears 64 and 70 and includes a clutch gear 106 fixed to first speed gear 64, a clutch gear 108 fixed to second speed gear 70, hub 110 fixed to output shaft 20, a shift sleeve 112 mounted for rotation with and axial sliding movement on hub 110, and a pair of synchronizers 114 located between shift sleeve 106 and clutch gears 106 and 108. First synchronizer clutch 104 is of the double-acting variety such that forward axial movement of shift sleeve 112 from its centered neutral position shown into engagement with clutch gear 106 will releasably couple first speed gear 64 to output shaft 20 for engaging the first power transmission path and establishing the first forward speed ratio. Moreover, rearward axial movement of shift sleeve 112 from its neutral position into engagement with clutch gear 108 will releasably couple second speed gear 70 to output shaft 20 for engaging the second power transmission path and establishing the second forward speed ratio.

To establish the third and fourth forward speed ratios, a second synchronizer clutch 116 is located between third and fourth speed gears 76 and 82 and includes a hub 118 fixed to intermediate shaft 26, a shift sleeve 120 mounted for rotation with and axial sliding movement on hub 118, and a pair of synchronizers 122. Second synchronizer clutch 116 is also of the double-acting type such that forward movement of shift sleeve 120 from its centered neutral position shown into engagement with third speed gear 76 will releasably couple third speed gear 76 to intermediate shaft 26 for engaging the third power transmission path, whereby transfer gear 92 drives output shaft 20 through gearset 84 for establishing the third forward speed ratio. Similarly, rearward movement of shift sleeve 120 from its neutral position into engagement with fourth speed gear 82 will releasably couple fourth speed gear 82 to intermediate shaft 26 for engaging the fourth power transmission path, whereby transfer gear 92 again drives output shaft 20 through gearset 84 for establishing the fourth forward speed ratio.

To establish the fifth and reverse speed ratios, a third synchronizer clutch 124 is located between fifth input gear 86 and reverse input gear 96 and includes a clutch gear 126 fixed to fifth input gear 86, a clutch gear 128 fixed to reverse input gear 96, a hub 130 fixed to input shaft 14, a shift sleeve 132 mounted for rotation with and axial sliding movement on hub 130, and a pair of synchronizers 134. Forward sliding movement of shift sleeve 132 from its centered neutral position shown into engagement with clutch gear 126 will releasably couple fifth input gear 86 to input shaft 14 for engaging the fifth power transmission path, whereby the fifth forward speed ratio is established. Rearward sliding movement of shift sleeve 132 from its centered neutral position into engagement with clutch gear 128 will releasably couple reverse input gear 96 to input shaft 14. As such, reverse input gear 96 drives idler shaft 38 which, due to the constant meshed engagement of the gears associated with gearset 94, drives output shaft 20 for establishing the reverse gear ratio.

When the first forward gear is established, drive torque is delivered from input shaft 14 to differential 44 through elements 62, 64, 106, 112, 110, 20, 58 and 54. When the second forward gear is established, drive torque is delivered from input shaft 14 to differential 44 through elements 68, 70, 108, 112, 110, 20, 58 and 54. When the third forward gear is established, drive torque is delivered from input shaft 14 to differential 44 through elements 74, 76, 120, 118, 26, 92, 86, 88, 20, 58 and 54. When the fourth forward gear is established, drive torque is delivered from input shaft 14 to differential 44 through elements 80, 82, 120, 118, 26, 92, 86, 88, 20, 58 and 54. When the fifth forward gear is established, drive torque is delivered from input shaft 14 to differential 44 through elements 130, 132, 126, 86, 88, 20, 58 and 54. Finally, when the reverse gear is established, drive torque is delivered from input shaft 14 to differential 44 through elements 130, 132, 128, 96, 98, 100, 102, 20, 58 and 54.

As the terms are used herein, all gears "rotatably supported" on a shaft are loosely mounted thereon using suitable bearings while all gears "fixed" to a shaft are non-rotatively mounted thereon via conventional means (i.e., splines, press-fit, welding, etc.) or are integrally formed thereon. Any suitable shift system that is operable for coupling each of shift sleeves 112, 120, and 132 to a gearshift lever (not shown) to coordinate movement therebetween for establishing the various forward and reverse gears can be used with transaxle 10. Moreover, the geartrain shown in transaxle 10 is arranged such that only one power transmission path is intended to be engaged at a time, with disengagement of all the power transmission paths establishing a neutral mode whereat no drive torque is transferred from input shaft 14 to output shaft 20. While it is not intended to be drawn to scale, FIG. 2 clearly illustrates the general relationship between the various shafts and the gear meshing associated therewith.

Referring now to FIG. 3, a modified version of transaxle 10, hereinafter designated as transaxle 10', is shown to incorporate a modified geartrain which again has all of its forward and reverse gears synchronized. In general, transaxle 10' is substantially similar to transaxle 10 described above with the exception that it includes a different synchronized reverse gear arrangement. Thus, in view of the substantial similarity in structure and function to the components of transaxle 10' with respect to transaxle 10, like reference numerals are used hereinafter and in the drawings to identify such like components while primed reference numerals designate those components that have been modified.

The synchronized reverse gear arrangement shown in FIG. 3 includes a reverse input gear 96' fixed to input shaft 14 that is in constant mesh with first idler gear 98. In addition, second idler gear 100 is in constant mesh with a reverse output gear 102' rotatably supported on output shaft 20. As shown, third synchronizer clutch 124 is now arranged as a single-acting type unit with shift sleeve 132 only movable between its centered neutral position and its position of engagement with clutch gear 126 for releasably coupling fifth input gear 86 to input shaft 14 for engaging the fifth power transmission path and establishing the fifth forward speed ratio. Transaxle 10' is shown to include a fourth synchronizer clutch 144 that is located adjacent to reverse output gear 102' and includes a clutch gear 146 fixed to reverse output gear 102', a hub 148 fixed to output shaft 20, shift sleeve 150 mounted for rotation with and axial sliding movement on hub 148, and a synchronizer 152 interposed between shift sleeve 150 and clutch gear 146. Rearward sliding movement of shift sleeve 150 from its centered neutral position shown into a position of engagement with clutch gear 146 will releasably couple reverse output gear 102' to output shaft 14. As should be clear, reverse output gear 102' is constantly driven in response to rotation of input shaft 14 due to the meshed engagement of reverse input gear 96' with first idler gear 98 and the constant meshed engagement of second idler gear 100 with reverse output gear 102'. Thus, movement of shift sleeve 150 to its engaged position will engage the sixth power transmission path and establish the reverse gear ratio. Accordingly, when reverse gear is established, drive torque is delivered from input shaft 14 to differential 44 through elements 96', 98, 32, 100, 102', 146, 150, 148, 20, 58 and 54.

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims. For example, the novel geartrain arrangements disclosed herein for use in the transaxles may likewise be used in a rear-wheel drive transmission wherein the differential would be removed and the output shaft would extend rearwardly for connection to the vehicle's rear driveline components.

What is claimed is:

1. A manual transmission comprising:

an input shaft;

an output shaft;

a first input gear fixed to said input shaft;

a first speed gear rotatably supported on said output shaft and meshed with said first input gear;

a second input gear fixed to said input shaft;

a second speed gear rotatably supported on said output shaft and meshed with said second input gear;

a first synchronizer clutch for selectively coupling either of said first and second speed gears to said output shaft;

an intermediate shaft having a transfer gear fixed thereto;

a third input gear fixed to said input shaft;

a third speed gear rotatably supported on said intermediate shaft and meshed with said third input gear;

a fourth input gear fixed to said input shaft;

a fourth speed gear rotatably supported on said intermediate shaft and meshed with said fourth input gear;

a second synchronizer clutch for selectively coupling either of said third and fourth speed gears to said intermediate shaft;

a fifth input gear rotatably supported on said input shaft and meshed with said transfer gear;

a fifth speed gear fixed to said output shaft and meshed with said fifth input gear;

a third synchronizer clutch for selectively coupling said fifth input gear to said input shaft;

a reverse input gear fixed to said input shaft;

a reverse output gear rotatably supported on said output shaft;

an idler gear meshed with said reverse input gear and said reverse output gear; and a fourth synchronizer clutch for selectively coupling said reverse output gear to said output shaft.

2. The manual transmission of claim 1 further comprising a differential driven by said output shaft.

3. A manual transmission comprising:

an input shaft;

an output shaft;

an intermediate shaft having a transfer gear fixed thereto;

first and second constant-mesh gearsets supported between said input shaft and said output shaft;

a first synchronizer clutch for selectively engaging either of said first and second gearsets for drivably connecting said output shaft to said input shaft for establishing first and second forward speed ratios therebetween;

third and fourth constant-mesh gearsets supported between said input shaft and said intermediate shaft;

a fifth constant-mesh gearset supported between said input shaft and said output shaft and meshed with said transfer gear for drivably connecting said intermediate shaft to said output shaft;

a second synchronizer clutch for selectively engaging either of said third and fourth gearsets for drivably connecting said intermediate shaft to said input shaft for establishing third and fourth forward speed ratios between said input shaft and said output shaft;

a third synchronizer clutch for selectively engaging said fifth gearset for drivably connecting said output shaft to said input shaft for establishing a fifth forward speed ratio therebetween;

a first reverse gear fixed to said input shaft;

a second reverse gear rotatably supported on said output shaft;

a third reverse gear meshed with said first and second reverse gears; and a fourth synchronizer clutch for selectively coupling said second reverse gear to said output shaft for establishing a reverse speed ratio between said input shaft and said output shaft.

4. The manual transmission of claim 3 further comprising a differential drivably connected to said output shaft.

5. A manual transmission comprising:

an input shaft;

an output shaft;

a first input gear fixed to said input shaft;

a first speed gear rotatably supported on said output shaft and meshed with said first input gear;

a second input gear fixed to said input shaft;

a second speed gear rotatably supported on said output shaft and meshed with said second input gear;

a first synchronizer clutch for selectively coupling either of said first and second speed gears to said output shaft;

an intermediate shaft having a transfer gear fixed thereto;

a third input gear fixed to said input shaft;

a third speed gear rotatably supported on said intermediate shaft and meshed with said third input gear;

a fourth input gear fixed to said input shaft;

a fourth speed gear rotatably supported on said first intermediate shaft and meshed with said fourth input gear;

a second synchronizer clutch for selectively coupling either of said third and fourth speed gears to said intermediate shaft;

a fifth input gear rotatably supported on said input shaft and meshed with said transfer gear;

a fifth speed gear fixed to said output shaft and meshed with said fifth input gear;

a reverse input gear rotatably supported on said input shaft;

a reverse output gear fixed to said output shaft;

an idler gear meshed with said reverse input and output gears; and a fourth synchronizer clutch for selectively coupling either of said fifth input gear and said reverse input gear to said input shaft.

6. The manual transmission of claim 5 further comprising a differential driven by said output shaft.

7. A manual transmission comprising:

an input shaft;

an output shaft;

an intermediate shaft having a transfer gear fixed thereto;

first and second constant-mesh gearsets supported between said input shaft and said output shaft;

a first synchronizer clutch for selectively engaging either of said first and second gearsets for drivably connecting said output shaft to said input shaft for establishing first and second forward speed ratios therebetween;

third and fourth constant-mesh gearsets supported between said input shaft and said first intermediate shaft;

a fifth constant-mesh gearset supported between said input shaft and said output shaft and meshed with said transfer gear for drivably connecting said intermediate shaft to said output shaft;

a second synchronizer clutch for selectively engaging either of said third and fourth gearsets for drivably connecting said first intermediate shaft to said input shaft for establishing third and fourth speed ratios between said input shaft and said output shaft;

a sixth constant-mesh gearset supported between said input shaft and said output shaft; and a third synchronizer clutch for selectively engaging either of said fifth and sixth gearsets for drivably connecting said input shaft to said output shaft for respectively establishing a fifth forward speed ratio and a reverse speed ratio therebetween.

8. The manual transmission of claim 7 further comprising a differential driven by said output shaft.

9. The manual transmission of claim 7 wherein said sixth gearset includes a first reverse gear rotatably supported on said input shaft, a second reverse gear fixed to said output shaft, and a third reverse gear meshing with said first and second reverse gears.

* * * * *

UNITED STATES PATENT AND TRADEMARK OFFICE
CERTIFICATE OF CORRECTION

PATENT NO. : 5,735,175
DATED : April 7, 1998
INVENTOR(S) : John R. Forsyth

It is certified that error appears in the above-identified patent and that said Letters Patent is hereby corrected as shown below:

Column 8, line 16, claim 5, delete "fourth" and insert --third--.

Column 8, line 40, claim 7, delete "first".

Signed and Sealed this

Sixth Day of October, 1998

Attest:

BRUCE LEHMAN

Attesting Officer       Commissioner of Patents and Trademarks